UNITED STATES PATENT OFFICE.

FRANCIS A. HALSEY, OF PHILADELPHIA, PENNSYLVANIA, ASSIGNOR OF ONE-FOURTH TO CHARLES HAMILTON, OF PHILADELPHIA, PENNSYLVANIA.

COMPOSITION OF MATTER FOR USE AS A RUBBER SUBSTITUTE.

1,223,692.

Specification of Letters Patent. Patented Apr. 24, 1917.

No Drawing. Application filed December 7, 1915. Serial No. 65,553.

*To all whom it may concern:*

Be it known that I, FRANCIS A. HALSEY, a citizen of the United States, residing at Philadelphia, in the county of Philadelphia and State of Pennsylvania, have invented a new and useful Composition of Matter for Use as a Rubber Substitute, of which the following is a specification.

This invention relates to a composition of matter for use as a rubber substitute especially designed for the production of vehicle tires and the like whereby a resilient product is obtained and skidding is prevented.

The composition consists of the following ingredients combined in substantially the proportions stated:—

| | |
|---|---|
| Pará rubber | 8 parts |
| Kieselguhr | 2 parts |
| Fullers' earth | 2 parts |
| Asbestos | 3 parts |
| Oxid of lead | 5 parts |
| Powdered sulfur | 1 part |
| Aluminum wool | 2 parts |
| Cotton waste | 2 parts |
| Wood pulp | 4 parts |

The several ingredients, except the cotton waste and the aluminum wool are thoroughly mixed in combination with any of the well known solvents, used with rubber and after this mixture has been effected, the cotton waste and aluminum wool are added and the parts thoroughly mixed until a homogeneous mass has been obtained. The resultant composition can be molded into articles of different kinds and is especially useful in the formation of cushion tires for automobiles and other vehicles, a tire of this material, after being vulcanized, being light and resilient and operating to grip upon any pavement so that the said tire will not skid. Furthermore, the product will withstand wear much better than the ordinary pneumatic tire.

It is to be understood that the proportions herein given may be varied somewhat without altering the resultant product.

What is claimed is:—

1. A composition of matter for use in the manufacture of vehicle tires and for like purposes, including Pará rubber, aluminum wool, and cotton waste.

2. A composition of matter for use in the manufacture of vehicle tires and for like purposes, including Pará rubber, kieselguhr, and aluminum wool.

3. A composition of matter for use in the manufacture of vehicle tires and for like purposes, including Pará rubber, kieselguhr, fullers' earth, oxid of lead, aluminum wool, cotton waste, and wood pulp.

4. The herein described composition of matter for use in the manufacture of vehicle tires and for like purposes, including Pará rubber, kieselguhr, fullers' earth, asbestos, oxid of lead, powdered sulfur, aluminum wool, cotton waste, and wood pulp, substantially in the proportions stated.

5. A composition of matter for use in the manufacture of vehicle tires and for like purposes, including Pará rubber and aluminum wool.

6. A composition of matter for use in the manufacture of vehicle tires and for like purposes, including Pará rubber, kieselguhr, fullers' earth, and aluminum wool.

In testimony that I claim the foregoing as my own, I have hereto affixed my signature in the presence of two witnesses.

FRANCIS A. HALSEY.

Witnesses:
ALBERT FRANK GRIFFITHS,
LAURENCE O'TOOLE.